(12) United States Patent  
Dix

(10) Patent No.: US 7,762,578 B2  
(45) Date of Patent: Jul. 27, 2010

(54) TETHER GUIDED INFLATABLE SAIL PANEL

(75) Inventor: Jeffery Carl Dix, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 910 days.

(21) Appl. No.: 11/540,800

(22) Filed: Sep. 29, 2006

(65) Prior Publication Data

US 2008/0079246 A1    Apr. 3, 2008

(51) Int. Cl.
  *B60R 21/213*  (2006.01)
  *B60R 21/237*  (2006.01)
(52) U.S. Cl. ..................... 280/730.2; 280/743.2
(58) Field of Classification Search ............... 280/730.2, 280/743.2; *B60R 21/213, 21/237*
  See application file for complete search history.

(56) References Cited

U.S. PATENT DOCUMENTS

| | | | |
|---|---|---|---|
| 6,176,515 B1 * | 1/2001 | Wallner et al. | 280/730.2 |
| 6,234,516 B1 * | 5/2001 | Boxey | 280/730.2 |
| 6,237,939 B1 * | 5/2001 | Resh | 280/730.2 |
| 6,361,068 B1 * | 3/2002 | Stein et al. | 280/730.2 |
| 6,428,037 B1 * | 8/2002 | Bakhsh et al. | 280/729 |
| 6,464,250 B1 * | 10/2002 | Faigle et al. | 280/730.2 |
| 6,471,240 B2 * | 10/2002 | Bakhsh et al. | 280/729 |
| 6,505,853 B2 * | 1/2003 | Brannon et al. | 280/730.2 |
| 6,565,118 B2 * | 5/2003 | Bakhsh et al. | 280/730.2 |
| 6,634,671 B2 * | 10/2003 | Heigl et al. | 280/743.2 |
| 6,637,769 B2 * | 10/2003 | Peer et al. | 280/730.2 |
| 6,695,347 B2 * | 2/2004 | Sonnenberg et al. | 280/743.2 |
| 6,758,490 B2 | 7/2004 | Hoeft et al. | |
| 6,851,707 B2 * | 2/2005 | Bakhsh et al. | 280/730.2 |
| 7,044,500 B2 | 5/2006 | Kalandek et al. | |
| 7,325,826 B2 * | 2/2008 | Noguchi et al. | 280/730.2 |
| 2002/0158450 A1 | 10/2002 | Hoeft et al. | |
| 2002/0175502 A1 * | 11/2002 | Tesch et al. | 280/730.2 |
| 2005/0140125 A1 | 6/2005 | Noguchi et al. | |
| 2010/0013203 A1 * | 1/2010 | Mitchell et al. | 280/743.2 |

* cited by examiner

*Primary Examiner*—Paul N. Dickson
*Assistant Examiner*—Joselynn Y. Sliteris
(74) *Attorney, Agent, or Firm*—Young Basile

(57) ABSTRACT

A side curtain airbag to be deployed downward along an inner side surface of a passenger compartment of a vehicle can include at least one expandible chamber having an inflatable curtain portion and an inflatable sail portion extending forwardly from a foremost anchor point of the curtain portion with respect to the vehicle, and a tether attached to the expandible chamber at one end and attachable to a structural pillar of the vehicle at an opposite end for guiding a direction of expansion of the sail portion during inflation. A method for folding a side curtain airbag can include forming an expandible chamber from an inflatable curtain portion and an inflatable sail portion, positioning the sail portion to be overlying the inboard side of the curtain portion with a Z-shaped fold portion, and locating the inboard side of the chamber facing inboard when in a stowed position.

25 Claims, 6 Drawing Sheets

TETHER GUIDED INFLATABLE SAIL PANEL

FIELD OF THE INVENTION

The present invention relates to an inflatable airbag curtain, and more specifically to a tether guided inflatable sail panel portion of a side curtain airbag to be deployed downward along an inner side surface of a passenger compartment of a vehicle.

BACKGROUND

Inflatable safety restraint devices or airbags, are standard equipment on most new vehicles. Front airbag modules can be located in the steering wheel on a driver side of the vehicle and in a dashboard on a passenger side of the vehicle. Side impact airbag systems can also be provided as either optional equipment or as standard equipment on new vehicles. Side airbags can be installed in a stowed condition adjacent a roof rail of a vehicle in order to be inflated to a deployed condition extending downwardly along an inner side surface of a passenger compartment of the vehicle. Front and side airbag modules can be deployed using expanding gases from an explosive charge contained within an inflator, sometimes referred to as a pyrotechnic inflator, or can be inflated by a stored gas inflator, both of which are conventional. Expanding gases travel through conduits and fill each airbag chamber to protect the vehicle occupants from harmful impact with interior portions of the vehicle. Side curtain airbags can be attached to a roof rail of a vehicle adjacent a joint between the headliner and the upper portion of the pillars supporting the roof. Typically, the side curtain airbags deploy vertically downward from the roof rail position. Various side curtain configurations have been disclosed, for example see U.S. Pat. No. 7,044,500; U.S. Pat. No. 6,758,490; and Patent Application Publication No. US 2005/0140125.

SUMMARY

It would be desirable to provide a side curtain airbag with an inflatable sail panel extending forwardly toward an "A" pillar of a vehicle. It would be desirable to provide a tether guide for guiding inflation of a forwardly extending inflatable sail panel portion of a side curtain airbag in a motor vehicle. A side curtain airbag to be deployed downward along an inner side surface of a passenger compartment of a vehicle can include at least one expandible chamber having an inflatable curtain portion and an inflatable sail portion extending forwardly from a foremost anchor point of the curtain portion with respect to the vehicle, and a tether attached to the expandible chamber at one end and attachable to a structural pillar of the vehicle at an opposite end for guiding a direction of expansion of the sail portion during inflation.

A side curtain airbag can include an expandible chamber having an inflatable curtain portion and an inflatable sail portion to be installed within a vehicle in a stowed condition proximate a roof rail of the vehicle. When inflated, the chamber can expand from the stowed condition to a deployed condition generally in front of an adjacent side of the vehicle, where the sail portion extends forwardly from a foremost anchor point of the curtain portion with respect to the vehicle. A Z-shaped fold of the sail portion can be provided with respect to the curtain portion prior to folding the curtain portion into a stowed condition for installation in the vehicle. A tether can be attached to the expandible chamber at one end and can be attachable to a structural pillar, such as the "A" pillar of the vehicle at an opposite end for guiding a direction of expansion of the sail portion during inflation.

A side curtain airbag for installation in a stowed condition proximate a roof rail of a vehicle and to be inflated to a deployed condition extending downward along an inner side surface of a passenger compartment of a vehicle can include an expandible chamber defined by an inboard side panel and an outboard side panel. The chamber can form an inflatable curtain portion and an inflatable sail portion. The sail portion can extend forwardly from a foremost anchor point of the curtain portion with respect to the vehicle. A Z-shaped fold can be provided in order to position the sail portion to be in an overlying relationship with respect to the inboard side panel of the curtain portion. A folded portion of the curtain and overlying sail portions can locate on the inboard side panel of the chamber to be facing inboard when in a stowed position.

A method for folding a side curtain airbag for installation in a stowed condition proximate a roof rail of a vehicle and to be inflated to a deployed condition extending downward along an inner side surface of a passenger compartment of the vehicle can include forming an expandible chamber defined by an inboard side panel and an outboard side panel, positioning a sail portion to be overlying the inboard side panel of the curtain portion with a Z-shaped fold, and locating the inboard side panel of the chamber to be facing inboard when in a stowed position with a folded portion of the curtain and overlying sail portion. The chamber can form an inflatable curtain portion and an inflatable sail portion. The sail portion can extend forwardly from a foremost anchor point of the curtain portion with respect to the vehicle. The fold portion can be selected from a group consisting of an accordion fold, a roll fold, and any combination thereof.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
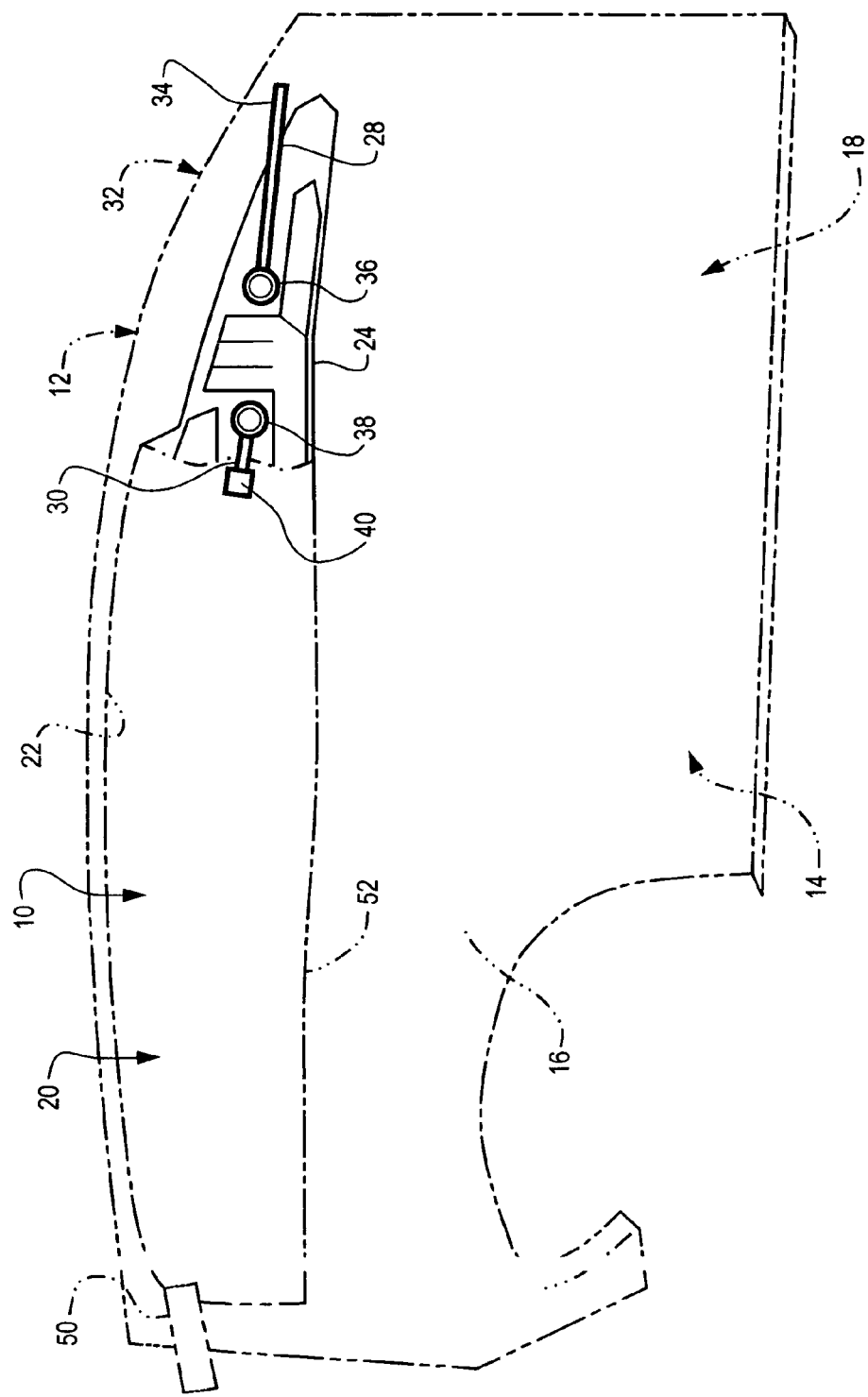
FIG. 1 is a simplified schematic view of an inner side surface of a passenger compartment of a vehicle shown in phantom, a conventional inflator and downwardly extending side curtain portion also shown in phantom, and an inflatable sail portion extending forwardly from a foremost anchor point of the curtain portion according to an embodiment of the present invention with a tether attached to an expandible chamber of the side curtain airbag at one end and attachable to a structural pillar of the vehicle at an opposite end for guiding a direction of expansion of the sail portion during inflation.

Referring now to FIGS. 1-4, a side curtain airbag 10 for installation in a stowed condition proximate a roof rail 12 of a vehicle 14 and to be inflated to a deployed condition extending downward along an inner side surface 16 of a passenger compartment 18 of the vehicle 14 is illustrated. The side curtain airbag 10 can include at least one expandable chamber 20 having an inflatable curtain portion 22 and an inflatable sail portion 24 extending forwardly from a foremost anchor point 26 of the curtain portion 22 with respect to the vehicle 14. A tether 28 can be attached to the expandable chamber 20 at one end 30 and can be attachable to a structural pillar 32 of the vehicle 14 at opposite end 34 for guiding a direction of expansion of the sail portion 24 during inflation.

The side curtain airbag 10 can include at least one eyelet 36, 38 associated with the sail portion 24 and operably engaged with the tether 28 for guiding the direction of expansion of the sail portion 24 during inflation. An anchor 40 at one end 30 of the tether 28 can be connected to the curtain portion 22 of the expandable chamber 20. A Z-fold 42 of the sail portion 24 with respect to the curtain portion 22 can be provided in the side curtain airbag 10 prior to folding the curtain portion 22 into a stowed condition for installation in the vehicle 14.

Figure 3:
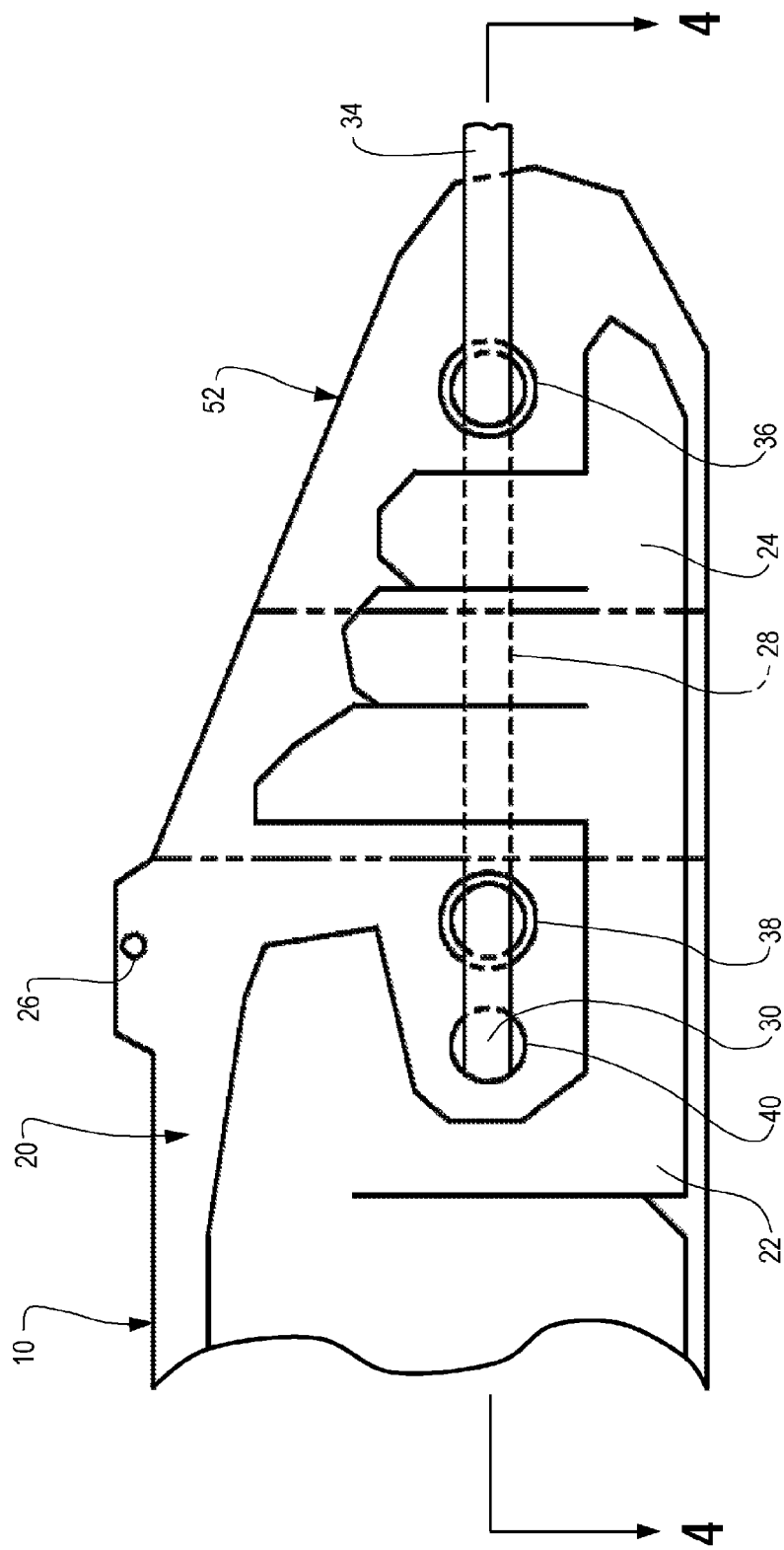
FIG. 3 is a detailed side elevational view of the inflatable sail portion illustrated in FIG. 2 in the deployed condition where the Z-shaped fold of the sail portion has been guided during inflation by a tether operably engaged through first and second eyelets associated with the sail portion.
Figure 5:
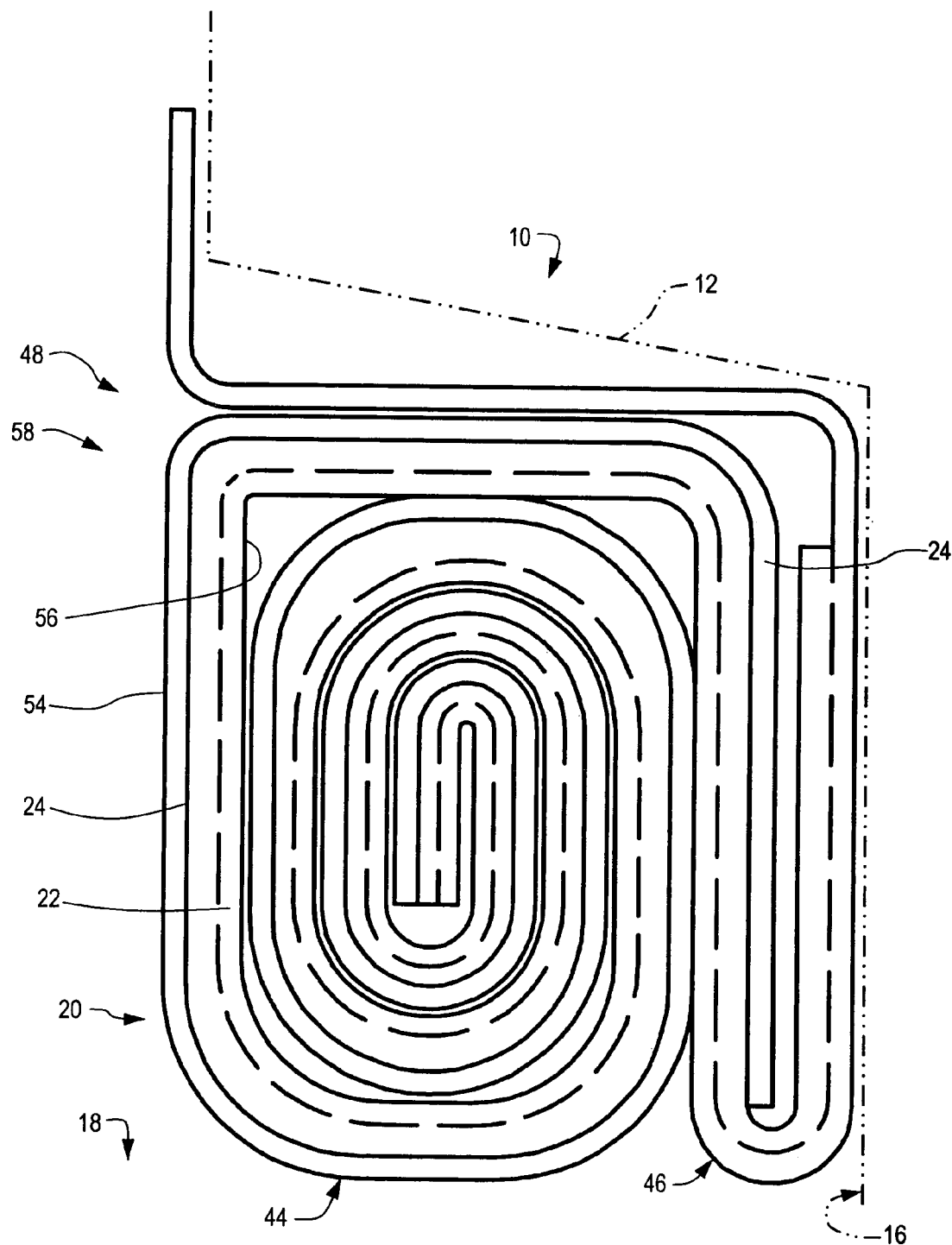
FIG. 5 is a simplified schematic cross-sectional view of a side curtain airbag with inflatable sail portion in a stowed condition using a combination roll fold and accordion fold.

Referring now to FIG. 3, the expandable chamber 20 can include the Z-fold 42 of the sail portion 24 with respect to the curtain portion 22 as best seen in FIG. 5, the Z-folded sail portion 24 and curtain portion 22 can be folded into a stowed condition with a roll fold 44, or a combination of an accordion fold 46 and roll fold 44 into a stowed condition 48 for installation into the vehicle 14 adjacent a roof rail 12. As best seen in FIG. 1, when inflated by an inflator 50, the expandable chamber 20 expands from the stowed condition 48 to a deployed condition 52 generally in front of an adjacent side 16 of the vehicle 14. The sail portion 24 extends forwardly from a forward most anchored point 26 of the curtain portion 22 with respect to the roof rail 12 of the vehicle 14.

Figure 6:
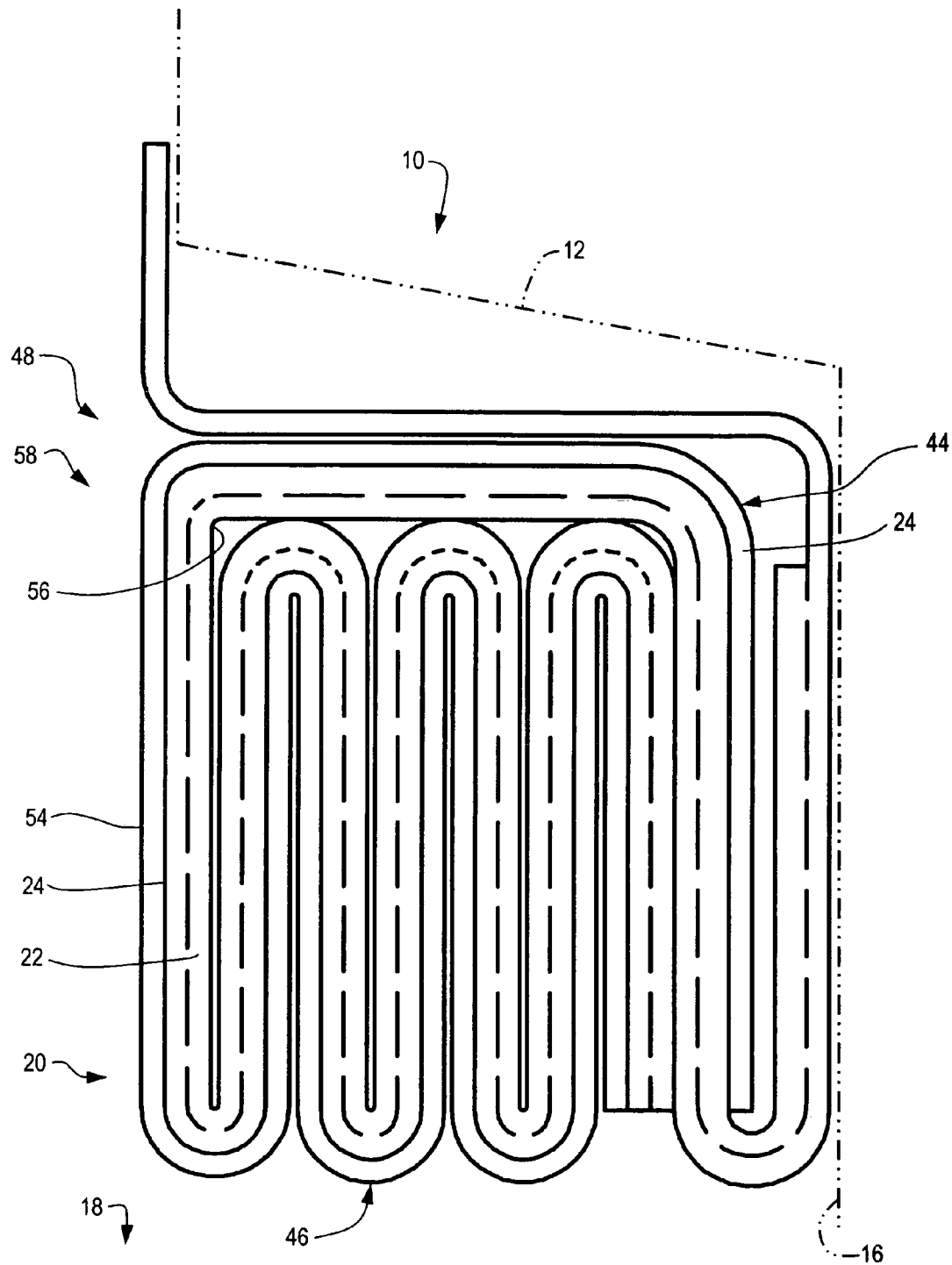
FIG. 6 is a simplified schematic cross-sectional view of a side curtain airbag with inflatable sail portion in a stowed condition using an accordion fold.

Referring now to FIG. 6, an accordion fold 46 of the expandible chamber 20, including the curtain portion 22 and sail portion 24, can be performed in order to place the chamber 20 in a stowed condition 48 for installation in the vehicle 14. The expandable chamber 20 including the Z-fold 42 of the sail portion 24 with respect to the curtain portion 22 can be folded into a stowed condition with an accordion fold 46 or a combination of an accordion fold 46 and roll fold 44 into a stowed condition 48 for installation into the vehicle 14 adjacent a roof rail 12. As best seen in FIG. 1, when inflated by an inflator 50, the expandable chamber 20 expands from the stowed condition 48 to a deployed condition 52 extending in front of an adjacent side 16 of the vehicle 14. The sail portion 24 extends forwardly from a forward most anchored point 26 of the curtain portion 22 with respect to the roof rail 12 of the vehicle 14.

Figure 2:
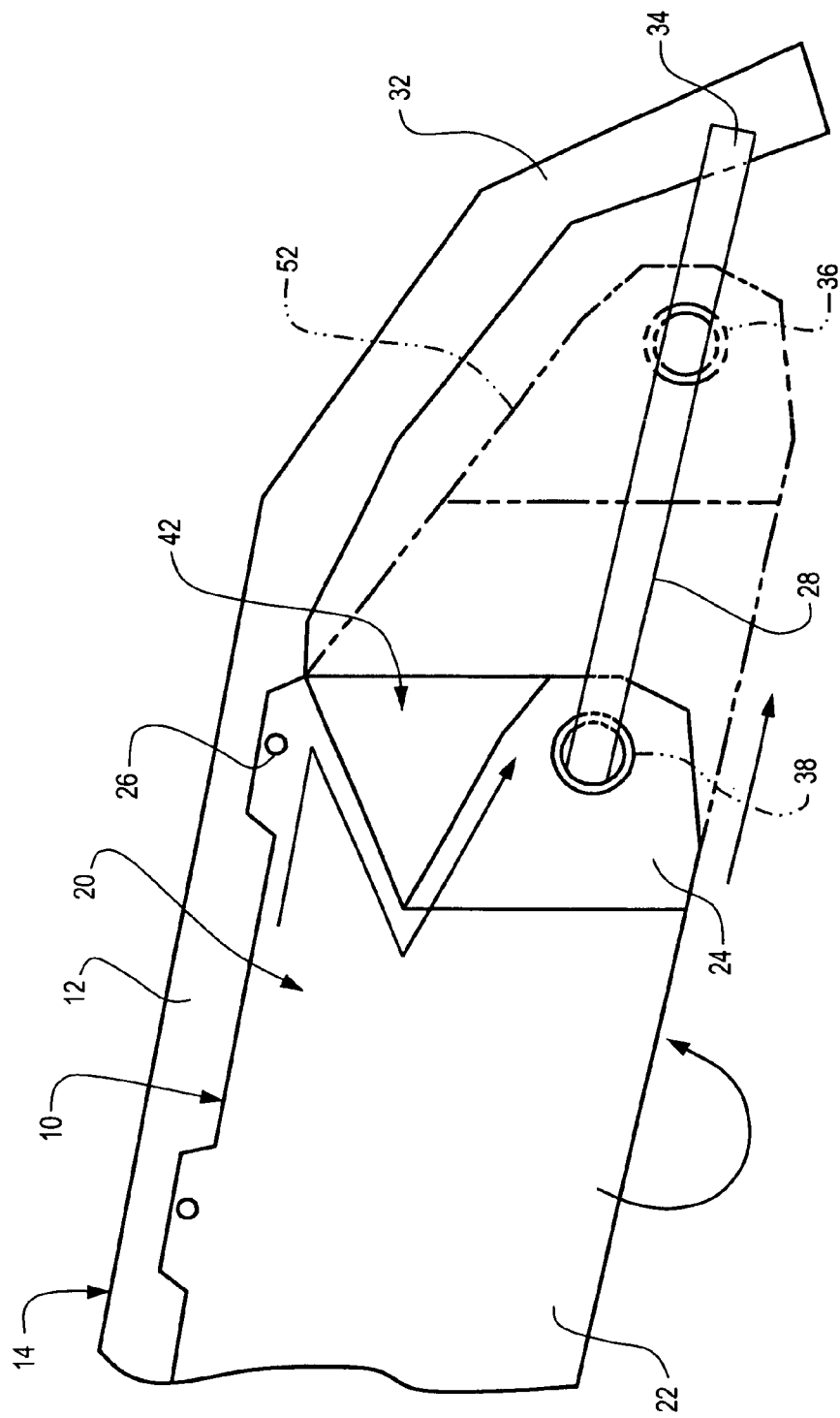
FIG. 2 is a detailed view of the inflatable sail portion according to an embodiment of the present invention illustrating a Z-shaped fold of the sail portion with respect to the curtain portion prior to folding the curtain portion into a stowed condition for installation in the vehicle with a tether extending through at least one eyelet associated with the sail portion for guiding the direction of expansion of the sail portion during inflation.
Figure 4:
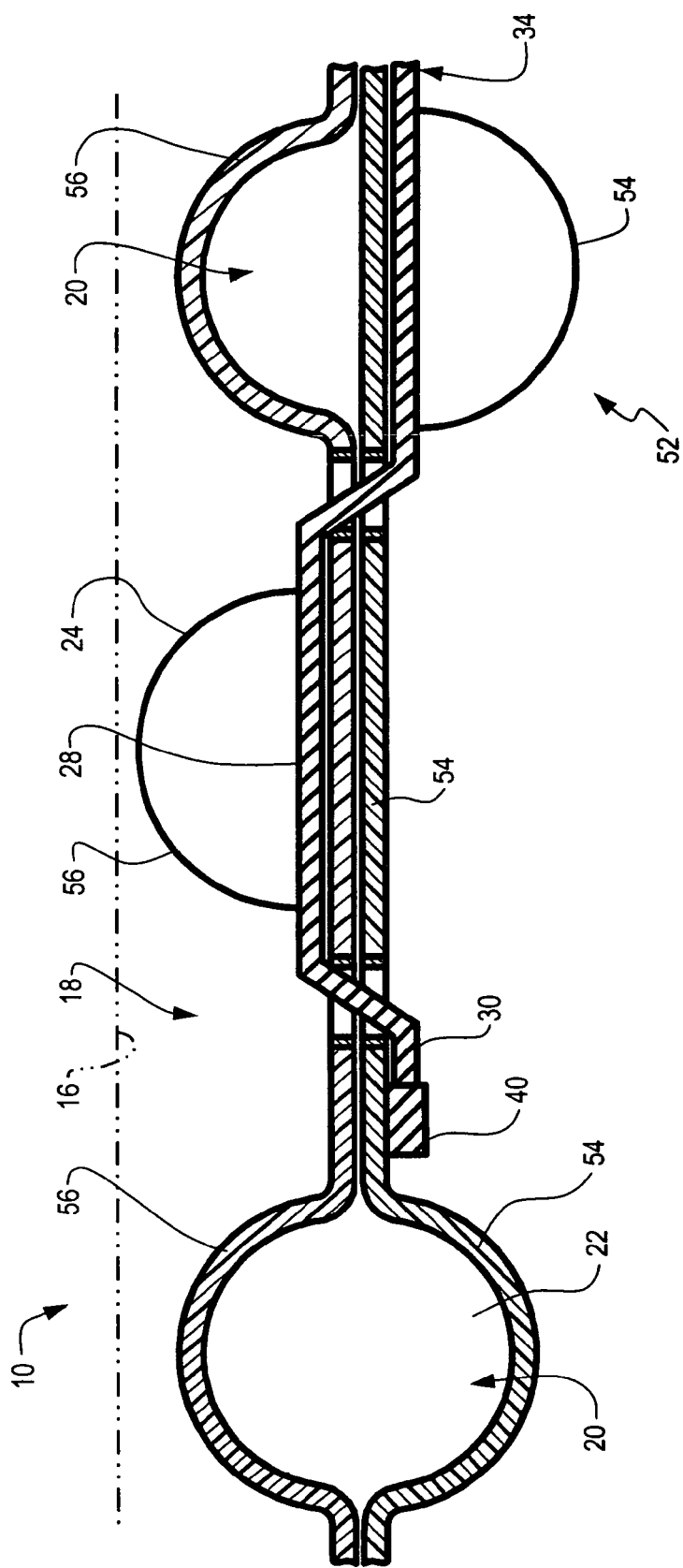
FIG. 4 is a cross-sectional view taken as shown in FIG. 3.

Referring now to FIGS. 2-4, the guide tether 28 can be connected or anchored to the curtain portion at one end 30 and can extend through one or more eyelets 36, 38 along a longitudinal length of the tether 28 to an opposite end 34. The opposite end 34 is configured to be connected with a structural pillar 32 of the vehicle 14. During inflation of the expandible chamber, the curtain portion 22 and sail portion 24 are unfolded from the stowed condition 48 during inflation, while moving toward the deployed condition 52. The sail portion is guided during inflation by the eyelet 36, 38 moving along the longitudinal length of the tether 28 from the anchor end 30 adjacent the curtain portion toward the opposite end 34 secured to a structural pillar 32 of the vehicle 14. The sail portion 24 expands in a forward direction from the foremost anchor point of the curtain portion 22 of the inflatable chamber 20. When fully extended in the forward direction of the deployed condition 52, the sail portion appears as illustrated in FIGS. 1 and 3, and the cross section of FIG. 4. During preparation of the expandible chamber 20, while being folded into the stowed condition 48, a Z-shape fold 42 can be performed as illustrated in FIG. 2 in order to fold the sail portion 24 in overlying relationship with respect to the curtain portion 22 of the expandable chamber 20. The Z-fold 42 illustrated in FIG. 2 slides the one or more eyelets 36, 38 along the longitudinal length of the tether 28 toward the anchor end 30.

As best seen in FIG. 4, a side curtain airbag 10 for installation in a stowed condition 48 adjacent a roof rail 12 of a vehicle 14 can be inflated as best seen in FIG. 1 to a deployed condition 52 extending downward along an inner side surface 16 of a passenger compartment 18 of the vehicle 14. The side curtain airbag 10 can include an expandable chamber 20 defined by an inboard flexible side panel 54 and an outboard flexible side panel 56. The expandable chamber 20 forms an inflatable curtain portion 22 and an inflatable sail portion 24. The sail portion 24 can extend forwardly from a foremost anchor point 26 of the curtain portion 22 with respect to the vehicle 14. A Z-shaped fold portion 42 can be used to position the sail portion 24 to be in an overlying relationship with respect to the inboard side panel 54 of the curtain portion 22. A fold portion 58, such as a roll fold 44, accordion fold 46, or any combination thereof can be applied to the curtain and overlying sail portion 22, 24, after the Z-shaped fold 42, in order to locate the inboard side panel 54 of the inflatable chamber 20 facing inboard with respect to the vehicle 14 when in a stowed condition 48.

According to an embodiment of the present invention, a method or process for folding a side curtain airbag 10 for installation in a stowed condition 48 adjacent a roof rail 12 of a vehicle 14 can be performed in order to place the side curtain airbag 10 in suitable condition to be inflated to a deployed condition 52 extending downward along an inner side surface 16 of a passenger compartment 18 of the vehicle 14. The method or process can include forming an expandable chamber 20 defined by an inboard side flexible panel 54 and an outboard side flexible panel 56. The chamber 20 forms an inflatable curtain portion 22 and an inflatable sail portion 24. The sail portion 24 extends forwardly from a foremost anchor point 26 of the curtain portion 22 with respect to the vehicle 14. The method or process can include positioning the sail portion 24 to be in an overlying relationship with respect to the inboard side panel 54 of the curtain portion 22 with a Z-shaped fold 42. The method or process can include locating the inboard side panel 54 of the chamber 20 facing inboard with respect to the vehicle 14 when in a stowed position 48 with a fold portion 58 of the combined curtain and overlying sail portions 22, 24. The fold portion can be selected from a group consisting of accordion fold 46, a roll fold 44, and any combination thereof.

The method or process can also include attaching a tether 28 to the expandable chamber 20 at one end 30 and having an opposite end 34 attachable to a structural pillar 32 of the vehicle 14 for guiding a direction of expansion of the sail portion 24 during inflation. The method or process can include threading the tether 28 through at least one eyelet 36, 38 associated with the sail portion 24 for guiding the direction of expansion of the sail portion 24 during inflation.

In operation, activation of the inflator 50 begins expansion of the expandible chamber 20 from the folded, stowed condition 48. Expansion of the chamber 20 applies sufficient pressure to the headliner joint adjacent the roof rail 12, causing separation of the headliner to provide a sufficient gap for passage of the side curtain airbag 10. Further inflation of the side curtain airbag 10 causes unfolding, generally vertical, downward deployment of the side curtain airbag 10 along the inner side surface 16 of the passenger compartment 18. When sufficiently unfolded in a vertically downward direction, additional inflation of chamber 20 causes unfolding of the Z-shaped fold 42 and deployment of the sail portion 24 in a forward direction with respect to the vehicle extending toward the structural pillar 32 located forward of the foremost anchor point 26 of the inflatable curtain portion 22 of the side curtain airbag 10. The tether 28 guides the inflation direction of the sail portion 24 as eyelets 36, 38 slide along the tether 28 during unfolding inflation of the sail portion 24.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A side curtain airbag to be deployed downwardly along an inner side surface of a passenger compartment of a vehicle comprising:
    a main body defining at least one expandable chamber having an inflatable curtain portion and an inflatable sail portion extending forwardly from a foremost anchor point of the curtain portion with respect to the vehicle;
    a tether attached to the main body at one end and attachable to a structural pillar of the vehicle at an opposite end for guiding a direction of expansion of the sail portion during inflation; and
    Z-shaped fold of the sail portion with respect to the curtain portion prior to folding the curtain portion into a stowed condition for installation in the vehicle.

2. The side curtain airbag of claim 1 further comprising:
    at least one eyelet associated with the sail portion and operably engaged with the tether for guiding the direction of expansion of the sail portion during inflation.

3. The side curtain airbag of claim 1 further comprising:
    an accordion fold of the curtain portion into a stowed condition for installation in the vehicle.

4. The side curtain airbag of claim 1 further comprising:
    a roll fold of the curtain portion into a stowed condition for installation in the vehicle.

5. The side curtain airbag of claim 1 further comprising:
    a combination of accordion fold and roll fold of the curtain portion into a stowed condition for installation in the vehicle.

6. The side curtain airbag of claim 1 further comprising:
    an anchor at one end of the tether connected to the curtain portion of the expandable chamber.

7. The side curtain airbag of claim 1 further comprising:
    the inflatable sail portion extending a majority of the distance between the foremost anchor point and the structural pillar after inflation of the expandable chamber.

8. The side curtain airbag of claim 1 further comprising:
    a first eyelet connected to a front end of the main body and having the tether extending therethrough for guiding the direction of expansion of the sail portion during inflation.

9. The side curtain airbag of claim 8 further comprising:
    a second eyelet connected to the main body adjacent to the inflatable curtain portion of the expandable chamber and having the tether extending therethrough for guiding the direction of expansion of the sail portion during inflation.

10. A side curtain airbag comprising:
    a main body defining an expandable chamber having an inflatable curtain portion and an inflatable sail portion to be installed within a vehicle in a stowed condition proximate a roof rail of the vehicle, and when inflated, the chamber expands from the stowed condition to a deployed condition generally in front of an adjacent side of the vehicle, the sail portion extending forwardly from a foremost anchor point of the curtain portion with respect to the vehicle;
    a Z-shaped fold of the sail portion with respect to the curtain portion prior to folding the curtain portion into a stowed condition for installation in the vehicle; and
    a tether attached to the main body at one end and attachable to a structural pillar of the vehicle at an opposite end for guiding a direction of expansion of the sail portion during inflation.

11. The side curtain airbag of claim 10 further comprising:
    at least one eyelet associated with the sail portion and operably engaged with the tether for guiding the direction of expansion of the sail portion during inflation.

12. The side curtain airbag of claim 10 further comprising:
    an accordion fold of the curtain portion into a stowed condition for installation in the vehicle.

13. The side curtain airbag of claim 10 further comprising:
    a roll fold of the curtain portion into a stowed condition for installation in the vehicle.

14. The side curtain airbag of claim 10 further comprising:
    a combination of accordion fold and roll fold of the curtain portion into a stowed condition for installation in the vehicle.

15. The side curtain airbag of claim 10 further comprising:
    an anchor at one end of the tether connected to the main body adjacent to the curtain portion of the expandable chamber.

16. The side curtain airbag of claim 10 further comprising:
    the inflatable sail portion extending a majority of the distance between the foremost anchor point and the structural pillar after inflation of the expandable chamber.

17. The side curtain airbag of claim 10 further comprising:
    a first eyelet connected to a front end of the main body and having the tether extending therethrough for guiding the direction of expansion of the sail portion during inflation.

18. The side curtain airbag of claim 17 further comprising:
    a second eyelet connected to the main body adjacent to the inflatable curtain portion of the expandable chamber and having the tether extending therethrough for guiding the direction of expansion of the sail portion during inflation.

19. A side curtain airbag for installation in a stowed condition proximate a roof rail of a vehicle and to be inflated to a deployed condition extending downwardly along an inner side surface of a passenger compartment of a vehicle comprising:

a main body defining an expandable chamber defined by an inboard side and an outboard side, the chamber forming an inflatable curtain portion and an inflatable sail portion, the sail portion extending forwardly from a foremost anchor point of the curtain portion with respect to a vehicle;

a Z-shaped fold portion positioning the sail portion to be overlying the inboard side of the curtain portion; and a fold portion of the curtain and overlying sail portions locating the inboard side of the chamber facing inboard when in a stowed position.

20. The side curtain airbag of claim 19, wherein the fold portion is an accordion fold portion.

21. The side curtain airbag of claim 19, wherein the fold portion is a roll fold portion.

22. The side curtain airbag of claim 19, wherein the fold portion is a combination accordion fold portion and roll fold portion.

23. A method for folding a side curtain airbag for installation in a stowed condition proximate a roof rail of a vehicle and to be inflated to a deployed condition extending downwardly along an inner side surface of a passenger compartment of a vehicle comprising:

forming a main body having an expandable chamber defined by an inboard side and an outboard side, the chamber forming an inflatable curtain portion and an inflatable sail portion, the sail portion extending forwardly from a foremost anchor point of the curtain portion with respect to a vehicle;

positioning the sail portion to be overlying the inboard side of the curtain portion with a Z-shaped fold portion; and locating the inboard side of the chamber facing inboard when in a stowed position with a fold portion of the curtain and overlying sail portions, wherein the fold portion is selected from a group consisting of an accordion fold, a roll fold, and a combination accordion and roll fold.

24. The method of claim 23 further comprising:

attaching a tether to the main body at one end and having an opposite end attachable to a structural pillar of the vehicle for guiding a direction of expansion of the sail portion during inflation.

25. The method of claim 24 further comprising:

threading the tether through at least one eyelet associated with the sail portion for guiding the direction of expansion of the sail portion during inflation.

* * * * *